United States Patent [19]

Lang et al.

[11] 4,139,231
[45] Feb. 13, 1979

[54] AUTOMOBILE REAR COMPARTMENT COVER

[75] Inventors: David Lang, Rochester; Mark Lobanoff, Troy, both of Mich.

[73] Assignee: Irvin Industries Inc., Stamford, Conn.

[21] Appl. No.: 903,929

[22] Filed: May 8, 1978

[51] Int. Cl.² .............................................. B60R 5/04
[52] U.S. Cl. .................................. 296/37.16; 296/76
[58] Field of Search .............. 296/37.1, 37.14, 37.16, 296/37.5, 76, 100; 150/52 E

[56] References Cited

U.S. PATENT DOCUMENTS

| 1,950,927 | 3/1934 | McMillan | 296/37.16 |
| 3,909,060 | 9/1975 | Katayama | 296/76 |

Primary Examiner—Richard A. Bertsch
Attorney, Agent, or Firm—McAulay, Fields, Fisher & Goldstein

[57] ABSTRACT

An automobile rear compartment cover, for use in covering the windowed rear compartment of automotive vehicles such as a hatch back or a station wagon, has an elongated hollow cylinder roller about which is rolled a flexible sheet member and which has a spring loaded pivot device in one end.

2 Claims, 8 Drawing Figures

AUTOMOBILE REAR COMPARTMENT COVER

BACKGROUND

For many reasons the current trend in automobiles is toward smaller "compact" type vehicles. Better gas mileage is one reason which is obvious to anyone purchasing petroleum products at recently inflated prices.

A second reason for the popularity of "compacts" is the ease with which smaller cars can negotiate the crowded urban the surban traffic conditions and even more crowded urban and suburban parking areas. This makes the "compact" cars a particularly favorably choice as a second car for local driving and as a means to reach public transportation.

In order to make the smaller cars more useful and, therefore, more attractive, a number of compacts are made in the form of a so-called hatch back. These vehicles are a hybrid between a sedan and a station wagon. The rear seat often folds down and a rear hatch opens to give a relatively large cargo area, thus doubling the usefulness of the vehicle.

Unfortunately, in just those crowded areas where a compact automobile is particularly useful, there is also an increased risk that one's automobile will be broken into. This is especially true where one can determined by mere inspection that valuable items may be stored in the cargo area of the automobile. Thus a hatch back or station wagon containing what appears to be valuable cargo is a particularly attractive target for a thief. One need only look into a rear window or side window to determined whether there is anything which appears to be valuable and, if so, determine if the risks inherent in breaking into the vehicle are worth the rewards.

Merely throwing a cover or drop cloth over items contained in the visible compartment of a hatch back or station wagon may reduce the chances that the cargo will be considered valuable — or may pique the curiosity of a possible thief due to the shape of the objects as reflected in the way the cover is draped or because of the presence of the cover itself.

Also of increasing popularity are van type vehicles for their small size and relatively large carrying capacity as well as their easy conversion, either customized or by way of factory "options," to camper-type vehicles. Unfortunately, the heater in these vans tend to be inadequate to warm the driver especially during cold northern winters.

It is an object of the present invention to provide a cover for an automobile rear compartment for use in concealing, from outside view, items stored in a normally visible rear compartment of an automobile vehicle.

It is a further object of this invention to provide a rear compartment cover which appears the same whether there are items stored beneath it or not.

It is a further object of the invention to provide a rear compartment cover which does not restrict access to the rear compartment when the hatch or rear door is opened. It is a related object of this invention to provide a rear compartment cover which can be left in place as a permanent fixture so as not to arouse curiosity by its presence.

It is a still further object to provide, for a van type vehicle, a strong taut cover over the forward opening of the rear compartment, especially just behind the front seats, to act as a thermal barrier during cold days and thereby increase the efficiency of the heater for the van.

SUMMARY OF THE DISCLOSURE

The objects of the invention are attained by utilizing a substantially rectangular flexible sheet member having sufficient width and length to cover the rear compartment over which it is to be deployed. The sheet member is anchored to, and wrapped around, a hollow cylindrical roller having a first pivot device at one end and a coil spring carrying second pivot device on the other end. The roller is secured to one side of the compartment and the flexible sheet member unrolled against the restraining forces of the coiled spring, and attached to an opposite side of the compartment. The coiled spring maintains tension against the sheet member thereby presenting a substantially smooth flat surface to the casual observer looking in from outside of the automobile.

By providing sufficient additional length and attaching the free end of the sheet member to the hatch or upwardly swinging door of the vehicle, the door can be opened without removing the cover. The sheet merely extends the additonal distance necessary to allow opening of the door thereby giving free access to the otherwise covered compartment area.

DESCRIPTION OF THE PREFERRED EMBODIMENT

Figure 1A:
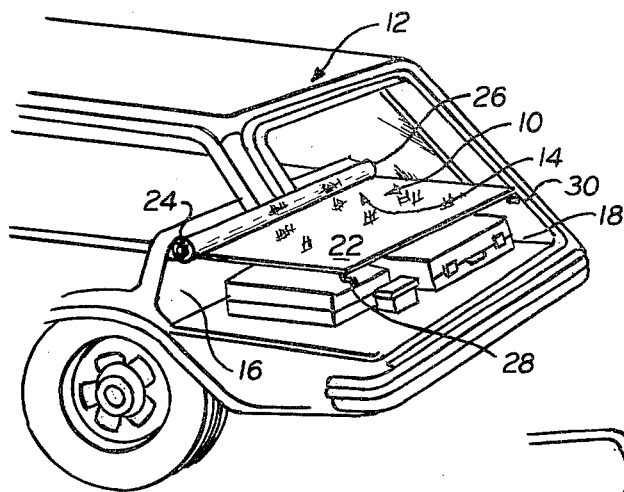
FIGS. 1A and 1B show an automobile rear compartment cover according to the present invention, mounted in place in the windowed rear compartment of a station wagon, hatch back or similarly bodied type of vehicle.
Figure 1B:
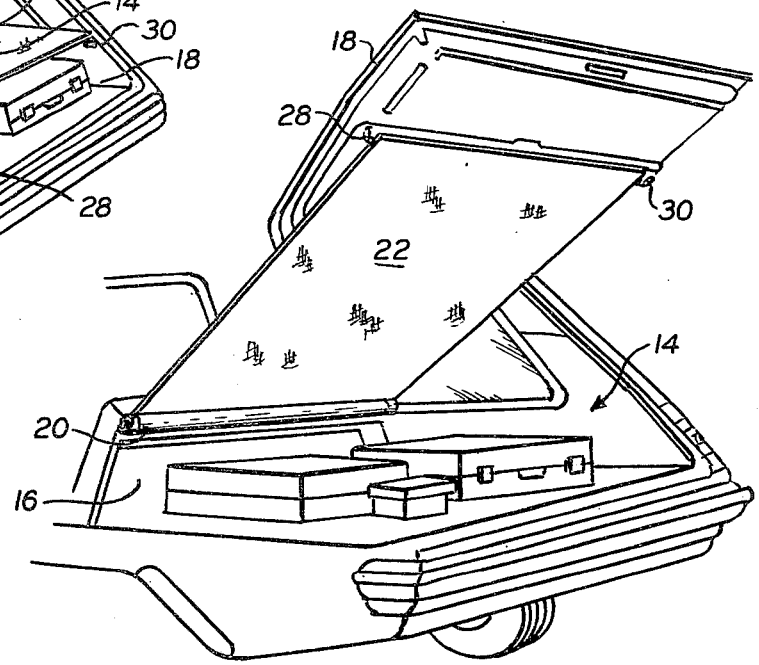

With reference to FIGS. 1A and 1B, an automobile rear compartment cover 10 is shown mounted in a station wagoned or hatch backed bodied automotive vehicle 12 and extended as a cover across the top of a windowed rear compartment 14 of the vehicle 12 (FIG. 1A). The preferred embodiment shown in the drawings is one wherein the rear compartment cover extends from the back of the rear seat 16 of the vehicle 12, across the rear compartment 14 and is attached to the hatch or rear door 18. As shown in FIG. 1B, this manner of attaching the cover 10 permits free access into the rear compartment 14 when the hatch 18 is opened. As shown in FIGS. 1A and 1B, the rear compartment cover 10 includes an elongated hollow cylindrical roller 20 having a flexible sheet member 22 anchored therein. First and second pivot devices 24, 26 rotatably secure the roller 20 to the back of the rear seat 16. The loose end of the flexible sheet member 22 is secured to the hatch 18 by any convenient device such as simple brackets or hooks 28, 30.

Figure 2:
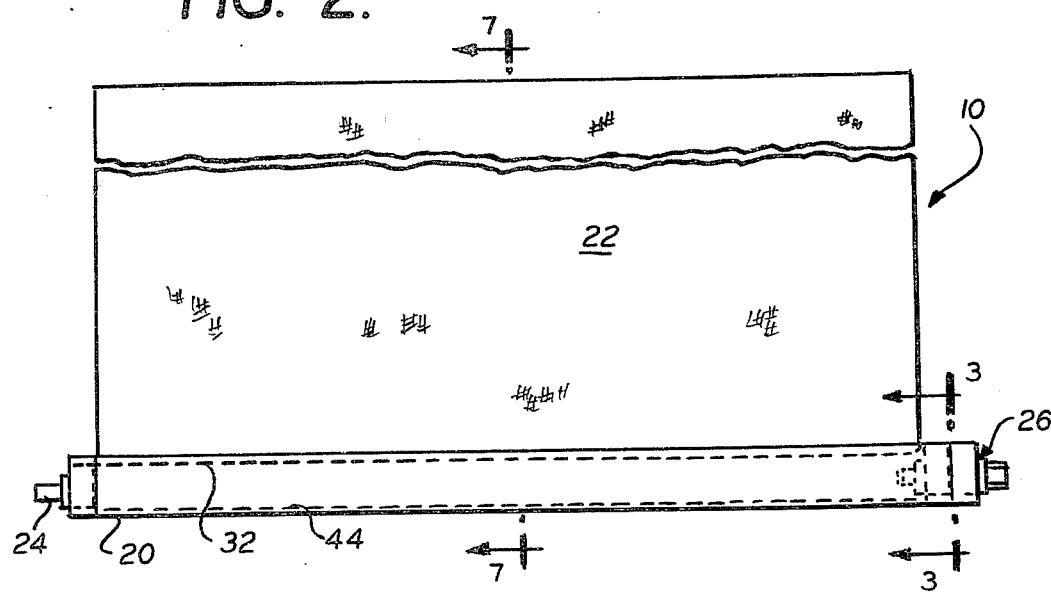
FIG. 2 is an elevational view of the automotive rear compartment cover device according to the present invention.

FIG. 2 shows the rear compartment cover 10 with the side of the roller 20 partially removed to show the relationship among the various elements.

Figure 7:
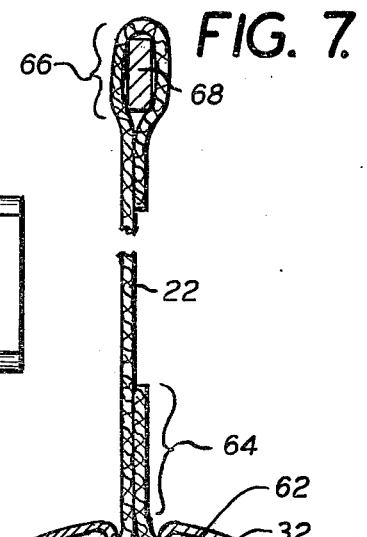
FIG. 7 is a cross-sectional view along 7—7 of FIG. 2 showing the anchoring of the sheet member to the roller.

As can be seen from FIG. 2, the sheet member 22 is anchored in an anchor groove 32 which preferably extends to one end of the roller for ease in inserting the sheet member 22. FIG. 7 is a sectional view through the middle of the roller 20 showing, in detail, the manner in which sheet member 22 is anchored in anchor groove 32. The first pivot device 24 is shown, partially in section, in FIG. 6. The second pivot device 26 containing the spring 54 is shown, in several different sections, in FIGS. 3, 4 and 5.

Figure 5:
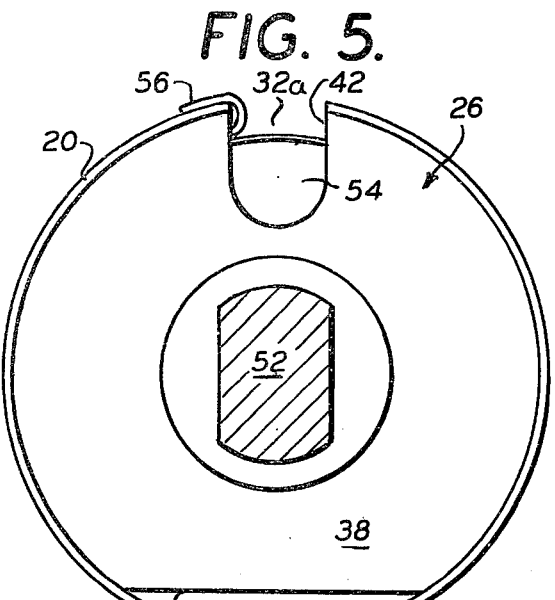
FIG. 5 is a cross-sectional and end view of the pivot device containing the coil spring and is taken along 5—5 of FIG. 4.
Figure 6:
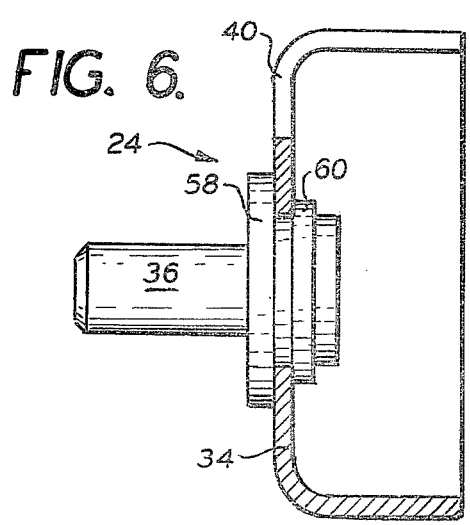
FIG. 6 is a partial transverse sectional and partial elevational view showing the pivot device which does not contain the coil spring.

As can be seen in FIG. 6, the first pivot device includes a casing 34 and a pivot shaft 36. The casing 34 is preferably identical to the casing 38, as shown in FIG. 5, of the second pivot device for reasons of economy of construction. However, the shaft 36 is circular in cross-section. The bottom portion 34b of the casing 34, is flat and there is a slot 40 in the top portion, both of which are the same shape and size as corresponding portions in casing 38, as shown in FIG. 5. Slot 42 (FIG. 5) is identical to slot 40 in size and shape only for economy of construction. However, the slot 40 must be of sufficient size and shape to fit around anchor groove 32.

With respect to that flat bottomed construction shown in FIG. 5, this is utilized for both pivot devices 24, 26 to allow clearance for the crimp closure 44 used to form hollow cylinder 20. In addition, a close fit between the flat bottom portion 34b, 38b of the pivot devies 24, 26 and the crimp closure 44, as can be seen in FIG. 3, restrains rotational movement of the pivot device within the hollow cylinder.

The pivot shaft 36 is centrally mounted in the casing 34, as if the casing were a complete circle, so that it will be co-extensive with the central axis of the cylindrical roller 20 when inserted into the end of the roller 20 as shown in FIG. 2. As can be seen in FIG. 2, the anchor groove 32 extends to the end of roller 20 which contains the first pivot device 24.

In addition, FIG. 2 shows the opposite end of the roller 20 containing, therewithin, the second pivot device.

Figure 3:
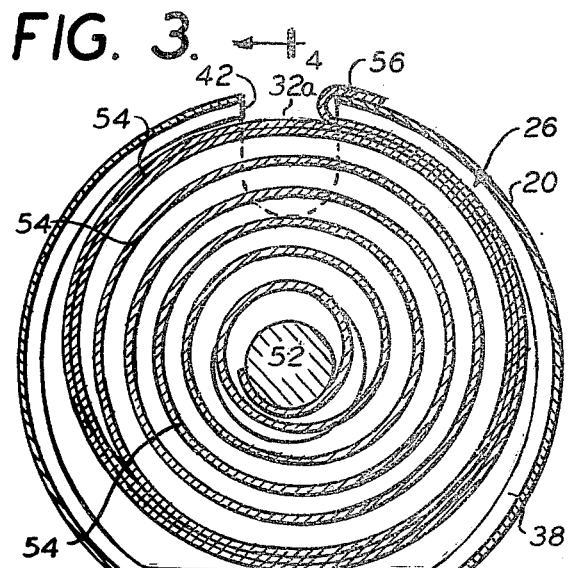
FIG. 3 shows an enlarged cross-sectional view along 3—3 of FIG. 2 showing the pivot device which contains the coiled spring mechanism.
Figure 4:
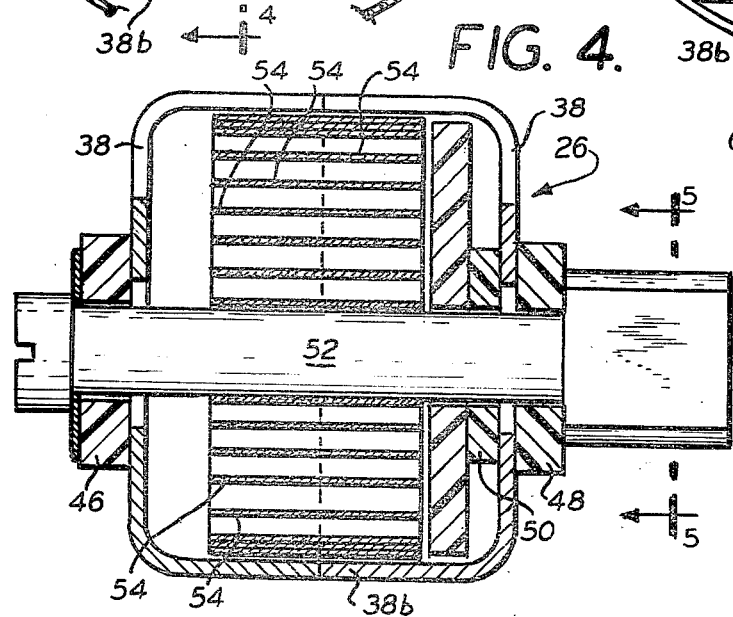
FIG. 4 is a transverse sectional view though the pivot device containing the coil spring and is taken along 4—4 of FIG. 3, with the roller deleted for clarity.

With reference to FIGS. 3-5, the second pivot device is an enclosure formed of two identical casings 38, 38 with centrally located bushings or bearings 46, 48, 50 which rotatably support a shaft 52 which extends through the double casing 38, 38 enclosure.

A spring, preferably a coil springs 54 is contained within the second pivot device 26 disposed about the shaft 52 and secured, at an inner end, to the shaft 52. As can be seen in FIG. 3, the coil spring 54 spirals radially from the shaft 52 and ends in a hooked outer end 56. With reference to FIG. 2, although the anchor groove 32 does not extend to the end of the roller 20, the slotted opening 32a of the groove does extend the full length of the roller 20. This can be conveniently constructed merely by cutting or grinding away the walls of the groove 32 at one end to accommodate the second pivot device 26. In any case, as can be seen in FIG. 3, the hooked end 56 of the coil spring 54 is secured, not to casing 38, but rather extends out of the opening 42 in the casing 38, through the opening 32a in the roller 20 and is hooked onto the side wall of the roller 20. In this manner, the coil spring 54 is connected between the shaft 52 and the roller 20 so that the casing 38 does not bear the strain of the operation of the device, as described in greater detail below.

As can be seen in FIG. 5, one end of the shaft 52 is non-circular. The other end of the shaft 52, as shown in FIG. 3, may be circular, but as will be obvious from the discussion of the operation below, the shape of the other end does not enter into the operation of the device, and is dictated mostly by convenience of construction. Similarly, the manner in which shaft 36 is secured to casing 34 of the first pivot device, is dictated by convenience and the durability requirements of the device. As shown in FIG. 6, washers or other enlarging devices 58, 60 may be force fitted over the shaft 36 to hold it in place.

As previously noted, FIG. 7 shows a detail of the manner in which the sheet member 22 is anchored in anchor groove 32 of the cylindrical roller 20. In the preferred embodiment shown in FIG. 7, the end of the sheet member 22 is folded over an enlarging member 62. The enlarging member 62 is conveniently a piece of suitably diametered rope. The folded over doubled section 64 of the sheet member 22 may be secured in place using adhesives or by sewing or other convenient means. As is obvious from FIG. 7, the total thickness of the doubled section 64 must not exceed the opening into anchor groove 32, while the portion containing the enlarging member 62 must exceed the size of the opening into anchor groove 32 in order to provide for anchoring of the end of the flexible sheet member 22 in the anchor groove 32, as shown in FIG. 7. The cross-sectional shape of anchor groove 32 is preferably substantially circular as shown in FIG. 7. This shape is particularly convenient to manufacture although, for the operation of the device, it is only necessary that the anchor groove contain a portion which is wider than the opening into the anchor groove wherein an enlarged portion of the sheet member 22 can be fitted and anchored.

The free end portion 66 of the flexible member 22, as shown in FIG. 7, may also be doubled over to form a loop wherein a stiffening member 68 can be contained. Stiffening member 68 may be a fiber board, fiberglass, or wooden stick, or other similar objects, which fits generally into the free end portion 66 of the flexible sheet member 22. The ends of stiffening member 68 may have holes drilled therein or therethrough, or brackets secured thereon, on other convenient means whereby it can be hooked onto the hatch 18 as shown in FIGS. 1A and 1B.

To anchor the sheet member 22 in the anchor groove 32, the enlarged end of the sheet member 20 can be inserted into the groove 32 where it extends to the end of the roller 20, and be slid along the groove 32 until it is in place.

Although the size of the sheet member 22 depends on the automobile compartment size, 750 cm × 1200 cm is an approximate usual size. As it is preferred that the sheet member 22 be stretched taut without stretch ridges or marks, the material from which it is made should be strong and somewhat heavy. In practice a vinyl laminated reinforced fabric of about 0.64 centimeters in thickness with a weight of about 18 oz/sq. yard has been found suitable.

Operation of the Device

Although the roller 20 may be secured along any side of the rear compartment 14 over which the cover device, according to the present invention, is to be extended, it is preferable to secure the roller 20 to either the hatch 18 or the back of the rear seat 16; most preferably, as shown in the drawings, to the back of the rear seat 16. The free end portion 66 of the sheet member 22 is secured to the opposite side of the rear compartment 14; for the most preferred embodiment, to the hatch 18. The length of the sheet member 22 should be sufficient to allow it to be extended far enough so that the hatch 18 can be completely opened as shown in FIG. 1B.

In securing the roller 20 to the rear of the rear seat 16, the first pivot means should be fitted into a suitable bracket such as an L-shaped metal strip having a circular opening to allow the circular shaft 36 to rotate freely. The second pivot means 26 is mounted in the end of the roller 20 with the non-circular portion of the shaft 52 extending outwardly. The non-circular portion of the shaft 52 should be fitted into a suitable bracket such as an L-shaped metal strip having a similarly shaped opening whereby rotation of the shaft is restrained. As the coil spring 54 is secured or connected between the shaft 52 which is annexed and the roller 20, rotation of the roller 20 will cause the coil spring 54 to either tighten or loosen. In normal storage, the sheet member 22 is rolled about the roller 20 in such a direction that by extending the sheet member 22 the roller is caused to rotate in a direction which tightens the spring 54 and causes a counter-rotational force to be generated by the spring. This maintains the flexible sheet member 20 in a taut condition when extended and causes it to automatically rewind on the roller should the free end 66 be released.

For use as a thermal barrier on a van type vehicle, the most convenient method of mounting is with the roller 20 mounted on the ceiling and bracket hooks 28, 30 mounted on the floor. The sheet member 22 can then be extended downwardly and attached to the floor to act as a thermal barrier.

Although preferred embodiments have been disclosed this is by way of illustration only. The invention is as defined by the claims, and their equivalents, as set forth below.

What is claimed is:

1. A motor vehicle compartment cover device for use in covering and thereby concealing the contents of a compartment in a motor vehicle comprising in combination:
   a. an elongated hollow cylindrical roller having first and second open ends, an elongated central axis, and an anchor groove formed in said roller substantially parallel to said central axis; said groove having a necked slotted opening formed the length of said roller and a walled portion forming an enlarged cross-sectioned enclosure and extending substantially the length of said roller but short of said second end;
   b. A substantially rectangular flexible sheet member having a width substantially co-extensive with said walled portion and a length at least of sufficient extent to cover said compartment, said sheet member being formed, near one edge portion, of material thin enough to fit through said necked opening and having said edge portion formed of predetermined thickness to fit into said walled portion and be unable to pass through said necked opening, whereby said sheet member may be anchored in said groove; said sheet member also including a means near a second edge portion operable to attach said sheet to said vehicle; and
   c. pivot means including first and second pivot devices disposed within said first and second ends, respectively, of said roller and being operable to rotatably connect said roller to the vehicle to allow the roller to rotate substantially about said central axis.

said first pivot device comprising a first casing and a first shaft, said first shaft being supported in said first casing disposed co-extensively with said axis;

said second pivot device comprising a second casing having a peripheral opening, a second shaft, and a spring, and wherein said casing rotatably supports said second shaft co-extensively with said axis, said spring being mounted within said second casing and having inner and outer ends and being loosely coiled about said second shaft with its inner end anchored to said second shaft; said peripheral opening being aligned with said necked slotted opening; the outer end of said coil spring being bent in a hooked-like configuration and extending through said peripheral opening to engage an edge of said necked slotted opening whereby said coil spring is connected between said second shaft and said roller;

said second shaft being operable to be non-rotatably secured to said vehicle whereby, when said cover device is mounted on said vehicle, rotation of said roller about its said axis with respect to said vehicle will tighten said coil spring and cause said spring to generate rotational forces in a counter rotational direction.

2. The compartment cover as claimed in claim 1 wherein said roller is formed of a tube having a crimp closure formed within the tube and extending the full length thereof;

said first casing and said second casing each having a generally circular perimeter surface to substantially match the generally circular inner surface of said roller, each said perimeter surface having a substantially flat portion to clear said crimp closure, engagement between said flat portions and said crimp closure restraining said casing from rotating with respect to said roller.

* * * * *